United States Patent [19]

Becker et al.

[11] Patent Number: 4,740,054
[45] Date of Patent: Apr. 26, 1988

[54] OPTICAL FIBER CABLE INCLUDING IRREVERSIBLY PRESHRUNK SUPPORTING ELEMENT AND METHOD OF MAKING SAME

[75] Inventors: Johann A. Becker, Overath; Werner Zell, Cologne, both of Fed. Rep. of Germany

[73] Assignee: U.S. Philips Corporation, New York, N.Y.

[21] Appl. No.: 636,036

[22] Filed: Jul. 30, 1984

[30] Foreign Application Priority Data

Aug. 11, 1983 [DE] Fed. Rep. of Germany ....... 3328948

[51] Int. Cl.$^4$ .......................... G02B 6/44; H02G 3/00; B29B 17/00; A01J 21/00
[52] U.S. Cl. ................................ 350/96.23; 350/96.10; 350/320; 174/70 R; 264/1.1; 264/1.5; 264/1.6; 264/342 R; 425/392
[58] Field of Search ............... 350/96.10, 96.23, 96.30, 350/320; 174/70 R, 102 R, 110 R, 110 SR, 70 S, 120 SR; 264/1.1, 1.5, 1.6, 2.2, 2.3, 2.4, 2.5, 2.7, 342 R, 342 RE, 230, DIG. 71; 29/446, 447; 156/47, 160, 161; 425/383, 392

[56] References Cited

U.S. PATENT DOCUMENTS

| | | | |
|---|---|---|---|
| 3,118,011 | 1/1964 | Breen | 264/230 |
| 3,377,415 | 4/1968 | Oppenlander | 264/342 RE |
| 3,606,655 | 9/1971 | Oberlander et al. | 264/342 RE |
| 3,813,098 | 5/1974 | Fischer et al. | 350/96.23 X |
| 4,169,657 | 10/1979 | Bedard | 350/96.23 |

FOREIGN PATENT DOCUMENTS

| | | | |
|---|---|---|---|
| 1131953 | 9/1982 | Canada | 350/96.23 |
| 3112422 | 4/1982 | Fed. Rep. of Germany | 350/96.23 |
| 3108109 | 9/1982 | Fed. Rep. of Germany | 350/96.23 |
| 2082790 | 7/1982 | United Kingdom | 350/96.23 |

Primary Examiner—William L. Sikes
Assistant Examiner—Brian M. Healy
Attorney, Agent, or Firm—Jack E. Haken

[57] ABSTRACT

The invention relates to a method of manufacturing a cable. In the cable, the conductors are surrounded entirely or partly by synthetic resin supporting elements. In order to avoid shrinkage of the supporting elements, and hence extra loads on cable at high temperatures, the supporting elements are preshrunk before assembly of the cable. The elements are preshrunk by heating a temperature just below the softening temperature of the synthetic resin in question, maintaining them at this temperature, and then cooling them. During the heating process, the strength elements are mounted in such a way that their contraction will not put them into tension.

10 Claims, 1 Drawing Sheet

AN OPTICAL FIBER CABLE INCLUDING IRREVERSIBLY PRESHRUNK SUPPORTING ELEMENT AND METHOD OF MAKING SAME

BACKGROUND OF THE INVENTION

The invention relates to a method of manufacturing a cable in which one or more electrical and/or optical conductors are surrounded entirely or partly by supporting elements. The supporting elements are made of a synthetic resin, and they extend over the whole length of the cable. The supporting elements and the conductors are covered with a cable sheath.

The invention further relates to a cable manufactured according to this method, in particular an optical cable.

German Offenlegungsschrift No. 3,112,422 describes the use of so-called filling elements in the core of the cable in addition to the conductors, in this case optical light conductors. The filling elements are provided to give the core of the cable a cross-section which is as circular as possible. The filling elements may be, for example, a synthetic resin.

A cable which has a synthetic resin central core is described in German Offenlegungsschrift No. 3,133,695 (corresponding to British Patent Application No. 2,082,790). The core is provided with longitudinal grooves in which the conductors are provided. A synthetic resin sheath is shrunk around the core and the conductors.

A disadvantage of these known cables is that the synthetic resin supporting elements, for example filling elements or central inserts, are subject to shrinkage during heating of the cable. Such shrinkage affects both the mechanical properties of the cables and the transmission properties of the optical fibers.

For example, a mixed armoured cable, which in addition to synthetic resin supporting elements also comprises tension-proof non-shrinking elements, may fail when the cable is subjected to high temperatures. As a result of the shrinkage of the supporting elements upon cooling of the cable, the tension-proof elements will open or warp and provide an extra load on the cable sheath present over the armour.

In optical cables the shrinkage of the supporting elements, which together with the optical conductors (fibers) may be provided in the cable core, increases an optional overlength of the fibers in the cable so that as a result the optical transmission properties of the cable are changed uncontrollably.

SUMMARY OF THE INVENTION

It is an object of the invention to provide a method of manufacturing a cable with supporting elements having reduced shrinkage after being subjected to high temperatures.

According to the invention, before the elements are incorporated into a cable, they are mounted in such a way that contraction of the elements will not cause them to be put into tension. The supporting elements thus mounted are then heated to a temperature just below the softening temperature of the synthetic resin, are maintained at this temperature for a period of time, and are then cooled again to ambient temperature.

Investigations into contractible supporting elements have demonstrated that an irreversible contraction is superimposed upon the reversible thermal expansion and contraction. The irreversible contraction will hereinafter be referred to as shrinkage. So the shrinkage process is an irreversible decrease in volume and length occurring over the course of time. As a result of the thermal treatment at a comparatively high temperature according to the invention, the shrinkage process is accelerated.

Since as a result of the method according to the invention the shrinkage process has been fully or nearly fully terminated before the supporting elements are connected to the other cable elements, shrinkage will not occur during subsequent rises in temperature. As a result, irreversible variations in the lengths of the supporting elements are avoided, which would otherwise subject the cable to an extra mechanical load and reduce the transmission properties thereof.

For carrying out the irreversible shrinkage process, the supporting elements may advantageously be wound, for example, on a drum coated with a compressible material or on a drum of a synthetic resin, the synthetic resin of the drum having a lower softening temperature than the supporting elements. During the shrinkage process, the winding diameter of the supporting elements wound on the drum will be reduced. However, since the drum diameter will also become smaller, the supporting elements will remain free of tension.

The supporting elements are heated preferably on the order of magnitude of a few hours, since the irreversible shrinkage process can then be transmitted substantially entirely.

DESCRIPTION OF THE PREFERRED EMBODIMENTS

Figure 1:
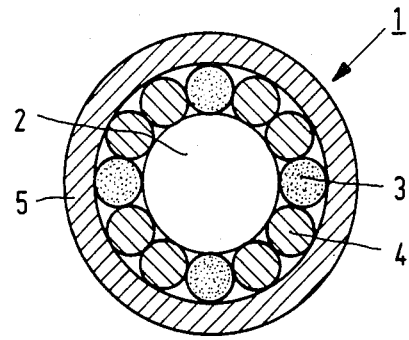
FIG. 1 is a cross-sectional view of a cable having a mixed armour.

The cable 1 shown in FIG. 1 has a cable core 2 which may have one of various constructions. For example, the cable core 2 may comprise optical conductors or electrical conductors. A mixed armour is provided over the cable core 2 and consists of tension-proof elements 3, for example aluminum wire, between which synthetic resin supporting elements 4 are provided. The synthetic resin elements 4 give the cable a circular cross-section. The cable 1 furthermore has a synthetic resin sheath 5 immediately engaging the mixed armour. The sheath may be, for example, extruded.

The supporting elements 4 preferably consist of polyethylene or polypropylene and are obtainable, for example, in the form of yarns, solid material, or tubes (hoses). Before providing the supporting elements 4 in the mixed armour, the elements 4 are tempered at a temperature which is slightly lower than the softening temperature of the synthetic resin. The temperature during tempering of the supporting elements of polypropylene was, for example, 120° C. The tempering time was approximately 6 hours. The softening temperature for polypropylene is approximately 150° C.

Supporting elements consisting of polyethylene are preferably tempered at 90° to 100° C. since the softening temperature is approximately 110° C.

For tempering, the supporting elements 4 are wound on a drum. The drum is coated with a compressible material, so that during shrinkage of the supporting elements 4 the diameter of the coated drum will also decrease. The elements 4 hence remain free of tension.

Instead of the coated drum, the drum may alternatively consist of a thermoplastic synthetic resin having a lower softening temperature than the supporting elements. At a temperature near the lower softening temperature, the drum can easily be compressed by the shrinking supporting elements. For example, supporting elements consisting of polypropylene may be shrunk a polyethylene drum at approximately 110° C.

Figure 2:
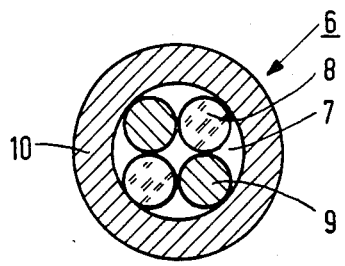
FIGS. 2 and 3 are cross-sectional views of optical cables having a circular cross-sections.

FIG. 2 shows a cable 6. The cable core 7 comprises two optical conductors (fibers) 8 and two rod-shaped, synthetic resin supporting elements 9 extending over the entire cable length. The supporting elements 9 give the cable a circular cross-section. Both the optical fibers 8, which may optionally comprise a separate coating, as well as the supporting elements 9 are surrounded by a common cable sheath 10. Stress relief elements (not shown) may also be present in the cable core. Moreover, the optical fibers 8 and the supporting elements 9 may be twisted, for example, with a coarse turn.

The synthetic resin supporting elements 9 are tempered at elevated temperature so that the irreversible shrinkage is substantially entirely terminated. A subsequent rise in temperature, for example, of the laid cable, can hence no longer cause any irreversible length contraction of the supporting elements 9. As a result, the overlength of the optical fibers will not change the transmission properties of the optical cable 6 will not be degraded.

Figure 3:
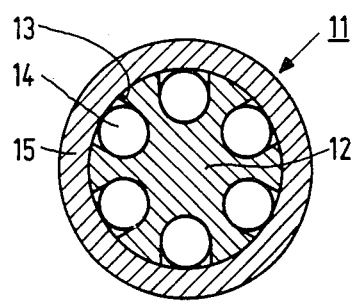

FIG. 3 also shows an optical cable 11 having a circular cross-section. This cable has a central supporting element 12 of synthetic resin. Supporting element 12 is provided with recesses 13 containing optical fibers 14. The optical fibers 14 are held in the recesses 13 by a common cable sheath 15.

The central supporting element 12 is manufactured, for example, from polypropylene or polyethylene. The central element 12 is tempered at a temperature below the softening temperature of the synthetic resin. Due to the tempering, the irreversible shrinkage of the central element 12 is terminated.

A few optical fibers 14 may be replaced by tension-proof elements (not shown), for example glass fiber-reinforced elements consisting of a synthetic resin, so as to increase the strength of the cable. Of course, electrical (metal) conductors may alternatively be provided in the recesses 13 instead of the optical fibers 14.

Figure 4:
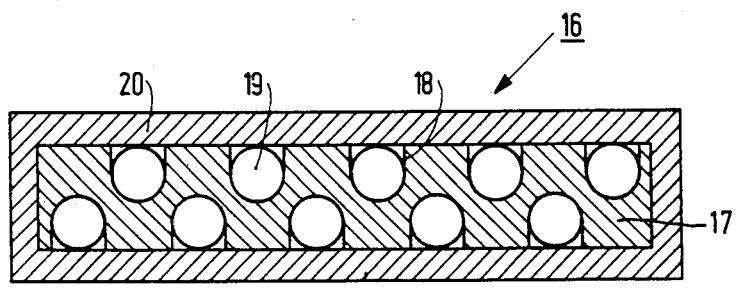
FIG. 4 is a cross-sectional view of an optical cable having a rectangular cross-section.

FIG. 4 shows a tape-shaped cable 16 with a rectangular supporting element 17. The synthetic resin supporting element 17 has parallel grooves 18 on both sides in which optical fibers 19 are provided. The fibers 19 are held in the groove by a common sheath 20.

Stress relief elements may be provided in a few grooves 18, instead of fibers 19.

The irreversible shrinkage of the supporting element 17 is terminated by tempering at a temperature immediately below the softening temperature of the synthetic resin in question.

What is claimed is:

1. A method of manufacturing a cable, said method comprising the steps of:
    providing a synthetic resin supporting element, said synthetic resin having a softening temperature;
    arranging the supporting element so it can contract without putting it into tension;
    heating the supporting element to a temperature just below the softening temperature and maintaining the supporting element at this temperature for a period of time sufficient to irreversibly shrink the supporting element;
    cooling the heated supporting element to ambient temperature; and then
    providing the preshrunk strength member in a cable.

2. A method as claimed in claim 1, characterized in that the supporting element is heated for a time on the order of magnitude of a few hours.

3. A method as claimed in claim 1, characterized in that the step of arranging the supporting element so it can contract without putting it in tension comprises the step of winding the supporting element on a drum coated with a compressible material.

4. A method as claimed in claim 3, characterized in that the supporting element is heated for a time on the order of magnitude of a few hours.

5. A method as claimed in claim 1, characterized in that the step of arranging the supporting element so it can contract without putting it in tension comprises the step of winding the supporting element on a synthetic resin drum having a softening temperature lower than the softening temperature of the supporting element.

6. A method as claimed in claim 5, characterized in that the supporting element is heated for a time on the order of magnitude of a few hours.

7. A cable comprising:
    at least one conductor, said conductor having a length;
    at least one synthetic resin supporting element extending alongside the conductor for the entire length of the conductor; and
    a sheath surrounding the conductor and the supporting element;
    characterized in that the supporting element has been irreversibly preshrunk so that the supporting element will experience substantially no further shrinkage.

8. A cable as claimed in claim 7, characterized in that:
    the conductor is an optical conductor; and
    the cable has a circular cross-section.

9. A cable as claimed in claim 8, characterized in that the cable further comprises stress relief elements.

10. A cable as claimed in claim 7, characterized in that the supporting element is a tape having at least one groove in which the conductor is arranged.

* * * * *